Aug. 20, 1929.  J. S. BAKER  1,725,174
ELECTRIC SWITCH
Filed Jan. 29, 1923  2 Sheets-Sheet 1
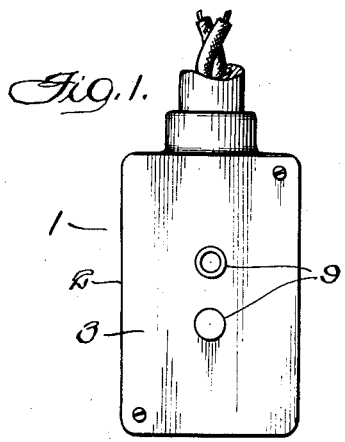
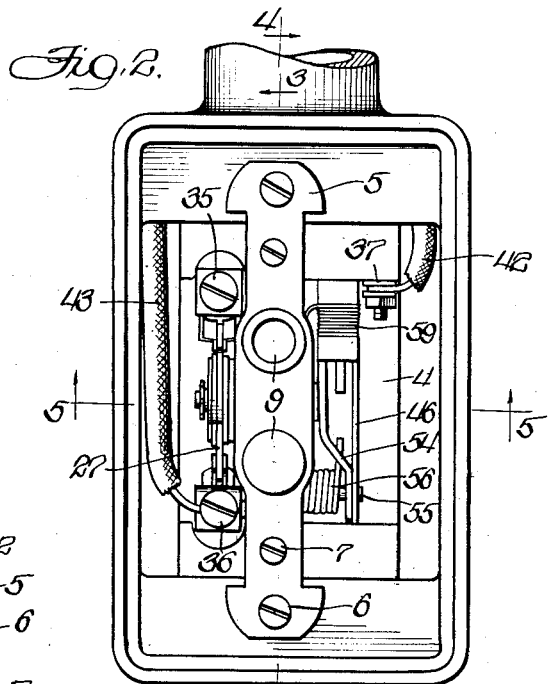
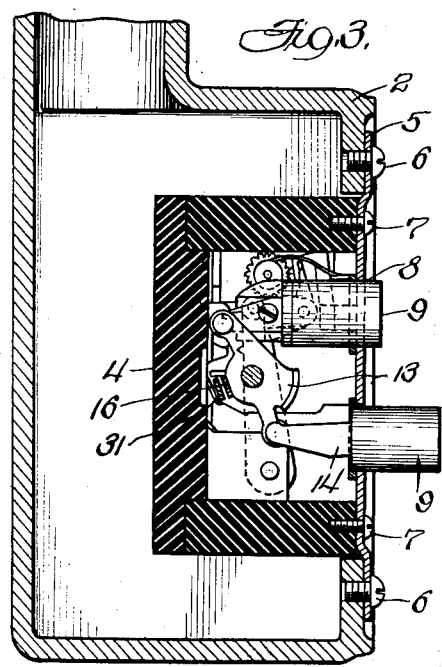
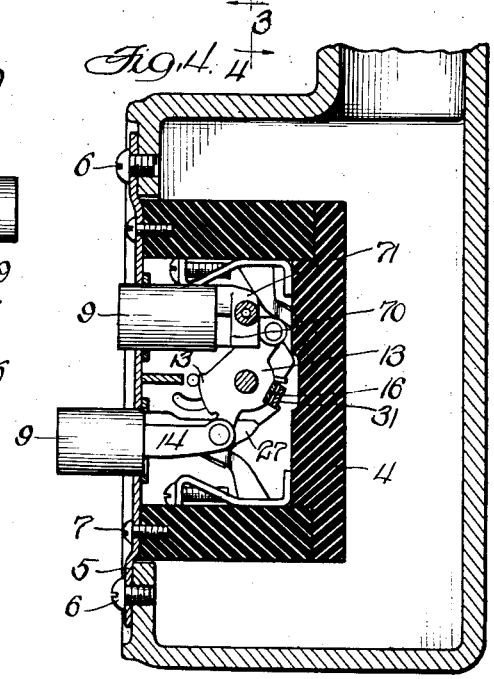
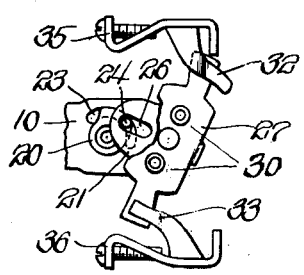
Inventor:
JOHN S. BAKER Aug. 20, 1929.  J. S. BAKER  1,725,174
ELECTRIC SWITCH
Filed Jan. 29, 1923   2 Sheets-Sheet 2
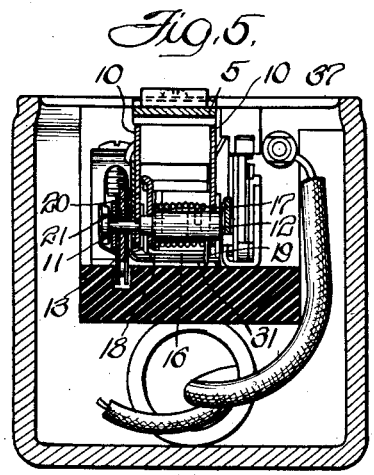
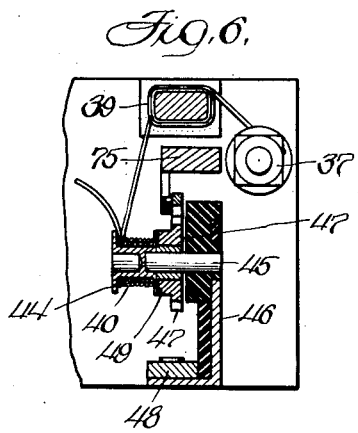
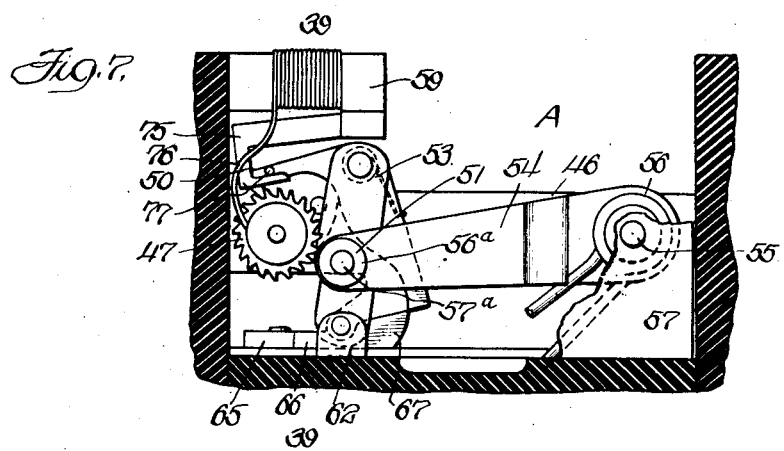
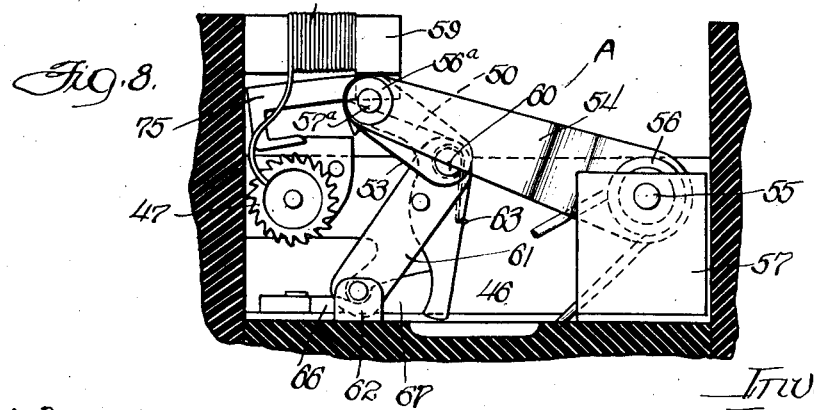
Inventor:
John S. Baker Patented Aug. 20, 1929.

1,725,174

UNITED STATES PATENT OFFICE.

JOHN S. BAKER, OF CHICAGO, ILLINOIS, ASSIGNOR TO COOK ELECTRIC COMPANY, OF CHICAGO, ILLINOIS, A CORPORATION OF ILLINOIS.

ELECTRIC SWITCH.

Application filed January 29, 1923. Serial No. 615,481.

My invention relates to protective devices for electrical circuits.

More particularly my invention has reference to the protection of circuits controlled by a wall switch of the push button type. Heretofore, heat coils have been employed as protective devices against abnormal currents in electric circuits. Such heat coils operate on a time limit principle, and consequently the protection afforded is insufficient to break extremely high overloads within a satisfactory minimum of time. For instance, the necessity of protecting a circuit of a dwelling which supplies current to such appliances as electric irons, mangles and washing machines is obvious. The electric iron, in time, will scorch the insulation of the cord, or the cord will fray at the junction point where it connects to the plug, thereby causing a short circuit. The washing machine cord is subject to abrasion by being dragged about the floor and being occasionally run over in its usual wet condition. Overloads in the circuit are principally due to heavy loads in the washing machine cylinder, insufficient lubrication, or jamming of the wringer.

Thus it is apparent that the protective device of such a circuit should respond instantly to short circuit currents and be provided with time element means to permit high starting currents of a momentary character, but to protect against continuing abnormally high currents, capable of damaging circuit wires, or such apparatus as motors, by overheating.

An object, therefore, of my invention is to provide a protective device embodying a time limit feature in the form of a self-soldering heat coil for protecting the circuit against continuing abnormally high currents which cause abnormal heat conditions within the circuit, and a current responsive element in the form of a magnetic trip for protecting the circuit against short circuits or extremely high overloads, both protective features operating the same switch member to control its open or closed positions.

So far as I am aware, I believe that I am the first to provide a protective device for electrical circuits, combining a time element feature and a magnetic trip, and shall therefore claim the same broadly, particularly its embodiment in a push button switch.

Another object of my invention is to provide a switch of the foregoing character which will be simple and economical to construct and efficient in operation.

In order to apprise those skilled in the art how to construct and practice my invention, I shall now describe a specific embodiment of the same taken in connection with the accompanying drawings, in which:

Figure 1 is a front elevation of a conduit box in which my improved wall switch is housed;

Fig. 2 is an enlarged view of the same with the cover removed;

Fig. 3 is a sectional view taken on line 3—3 of Fig. 2;

Fig. 4 is a sectional view taken on line 4—4 of Fig. 2;

Fig. 5 is a transverse sectional view taken on line 5—5 of Fig. 2;

Fig. 6 is a detail sectional view through the axis of the thermostatic element and part of the overload coil;

Fig. 7 is a detail view of the circuit breaker embodying my invention, illustrating it in position ready for actuation;

Fig. 8 is a similar view illustrating the circuit breaker actuated or released; and Fig. 9 is a fragmentary detail view of the stationary and movable switch contact members.

It is to be understood, at the outset, that the underlying principles of my invention may be embodied in types of switches other than the push-button switch. For instance, the employment of a heat coil and a magnetic trip as a protective device need not be limited to circuit breakers or manually operable switches of any particular type. The particular embodiment, as shown in the drawings, of the thermostatic element for automatically actuating a push button switch has novel features and advantages which are to be especially noted.

Referring to the drawings, a push button switch 1 is housed within a conduit box 2 provided with a removable cover 3. As is well known, the outlet box is usually embedded in the wall of the room where the switch is employed, so that the cover 3 lies flush with the plaster, and oppositely moving parallel push buttons 9 protrude for manual actuation. The switch mechanism 1 is carried as a unit within the housing by a U-shaped mounting block 4, suspended from the front face by means of a strap 5, secured to the box 2, as by screws indicated at 6. The strap 5 holds the block 4 suspended by screws 7, and is provided with aligned openings 8, in which push buttons 9 are guided.

As shown in Fig. 5, a pair of opposed plates 10 depend, in rigid relation, from the strap 5. Journaled in the lower ends of the plates 10 is a pin 11, carrying at one end a loosely mounted concentric sleeve 12. Upon the shaft 11 is rigidly secured a rocker arm 13, to which, at each side of its pivotal mounting, are connected the buttons 9 through links 14, as shown in Fig. 3. The rocker arm 13 is formed with a projection 16 extending transversely in the direction of the sleeve 12, about which a coil spring 17 is disposed. The spring 17 is placed under tension, when mounted upon the sleeve, by turning it one or two times, so that its ends 18 and 19 tend to move away from each other. Upon the tendency of the ends 18 and 19 to separate, the tension of the spring 17 is increased, until the movement of one end past a certain point causes the other end to follow. I utilize this stored up energy, caused by the separating movement of the spring ends to move the switch to on or off-positions. This is accomplished by a rocker mechanism formed by members 20 and 21. The member 20 is pivotally mounted on one of the depending plates 10 and guided in a slot 23 formed in this plate. A pin 24 anchored in the member 20 rides in a slot 26 in the member 21, which is loosely carried upon the pin 11 and rigidly secured to a movable contact member 27 by means of rivets 30.

The member 21 is provided with a transverse arm 31 lying parallel to the transverse projection 16 on the rock arm 13. The end 18 of the coil spring 17 engages the transverse projection 16, while the end 19 engages the transverse arm 31. When either button 9 is depressed, depending of course upon the position of the contact member 27, the rocker arm 13 brings its integral transverse projection 16 against one of the ends 18 and 19, until sufficient energy is stored up in the spring 17 to cause the opposite end of the spring to throw the transverse arm 31. Being rigid with the movable contact members 27, the arm 31 will, through the above mentioned rocker mechanism, reverse the position of the movable contact member 27 by a positive snap action.

As shown in Fig. 9, a pair of stationary contact members 32 and 33 is suitably secured to the side walls of the suspended U-shaped mounting block 4. They comprise essentially resilient clip contacts having parallel jaws, between which the ends of the movable blade 27 engage. Terminal binding posts 35 and 36 are provided in direct contact therewith. The description thus far has had to do with an old and well known type of switch mechanism and my invention as applied thereto will now be disclosed.

The current enters the switch preferably at the binding post 37 from where it may be traced through two coils 39 and 40 to the binding post 35 (see Fig. 6), and thence through the movable contact member 27, if in engagement with the stationary contacts 32 and 33 to the binding post 36. Conductors 42 and 43 connect with binding posts 37 and 36, respectively.

As shown in detail in Figs. 6 to 8 inclusive, a current carrying coil 40 that serves as a heat generating medium, is wound about a spool 44 of relatively high heat conductivity, which is carried rigidly upon a pin 45 anchored in a plate 46, secured rigidly to the base of the suspended U-shaped mounting block 4, as indicated at 48. Mounted for rotation on the pin 45 is a ratchet wheel 47 normally held rigid by means of a fusible seal 49 between one face of the wheel and the spool 44. Preferably, the fusible seal 49 consists of a soldered connection, so that during normal temperature the ratchet wheel 47 will not rotate.

A latch 50 controlled by a toggle mechanism designated generally by A and shown in detail in Figs. 7 and 8 is mounted substantially in the same plane as the ratchet wheel 47. Normally, the latch 50 is adapted to engage the ratchet wheel 47 under spring tension, so that a considerable force in an upward direction is exerted against one of the push buttons through a stud 51, comprising a pin 57$^a$, when the latch is released by the melting of the fusible seal 49. Toggle mechanism A comprises a link 53, an arm 54 loosely mounted upon a pin 55, and a coil spring 56 surrounding this pin. The plate 46 is provided with an extension terminating in a wall 57, the pin 55 being secured in the plate 46 and the wall 57. As shown in Fig. 2, the arm 54 is bent slightly, so that one end of this coil spring will bear upwardly against the same, tending to throw the toggle mechanism to the position shown in Fig. 8. The engagement of the latch 50 with the ratchet wheel 47 prevents such movement until the heat developed in the coil 40 builds up to a predetermined value and melts the fusible seal 49, whereupon the wheel 47 is released to free the latch 50. Stud 51 is an extension of the pivotal connection between the link 53 and the arm 54, and comprises a sleeve 56$^a$ mounted upon the pin 57$^a$. When the latch 50 is released, the free end of the coil spring 56 throws the arm 54 about its pivot, being stopped from continued movement upon striking a projecting electromagnetic 59, the purpose of which will be hereinafter explained.

The latch 50 is pivotally connected at 60 to the link 53 and an arm 61, secured at its opposite end to a lug 62 that is integrally formed with the stationary wall 46. A wire spring 63 wrapped at one end about the pin 60 and its other end passing through the latch 50 at a distant point from this pin 60 tends to hold the hooked end of the latch 50 downwardly, so that when the latch is brought into engagement with the wheel 47, it will hold itself engaged therewith providing the soldered joint 49 is frozen.

While the mechanism has been shown horizontal in Figs. 6 to 8 inclusive, it usually is mounted vertically on the wall, with the side on which the thermostatic element or heating coil is disposed, constituting the upper end. A gravity member 65 is adapted for slidable reception between the lug 62 and the wall 46. The movement of the member 65 is, however, limited by a slot 66 cut in one side thereof, in which the lower end of the arm 61 rides. The enlarged end 67 tends to bear against the lower end of the pawl 50 and assists the spring 63 in holding the hooked end of the pawl in engagement with the toothed wheel 47, when the toggle mechanism is in the position shown in Fig. 7.

As shown in Fig. 4, the upper push button 9 is provided with a shoulder 70 formed on a member 71 secured directly to the inner end of this upper push button. When the pawl 50 is released, either in the manner as above pointed out as a result of an overheating of the coil 40, or, as will be described presently as the result of a sudden flow of excess current, the stud 51 is moved with considerable force against said shoulder 70 to move the upper button outwardly. This, of course, operates the switch mechanism, and moves the contact member 27 to open position, thereby breaking the circuit.

Assuming that the above automatic actuation of the switch to off-position results from the overheating of the coil 40, resetting of the switch is prohibited until the abnormal condition in the line has been removed and the temperature lowered to permit solidification of the soldered joint 49. The circuit may be tested by pushing the upper button 9 inwardly to force the latch 50 into engagement with the wheel 47. If it is now in normal condition, the circuit may be again closed, as the wheel 47 will be held rigidly to retain the latch 50. However, should the abnormal condition still obtain, the wheel 47 will rotate and refuse to hold the latch.

The current carrying coil 39 of the solenoid 59 is in series connection with the coil 40. When abnormal current surges through the line at a relatively high rate and heat is not generated quickly enough in the coil 40 to melt the fusible joint 49, the armature 75 of the solenoid 59 is attracted, causing the hooked end 76 thereof to move upwardly. Normally a projection 77 on the latch 50 is engaged by this hooked end 76, and consequently, when the latter is moved upwardly, it will trip the latch from engagement with the ratchet wheel 47. Toggle mechanism A will function precisely in the same way as before to move the upper push button 9, through the projection 51. The movable contact member 27 is thereby thrown to open position and the circuit is broken.

It is to be noted that the hooked end 76 is so related to the latch 50 that the latter will, upon being moved to engage the wheel 47, be tripped from engagement as long as the armature remains attracted by the solenoid. Consequently, it is impossible to reset the switch, if abnormal current continues to flow through the line.

Without further elaboration, the foregoing will so fully explain the gist of my invention, that others may, by applying current knowledge, readily adopt the same for use under varying conditions of service, without eliminating certain features, which may properly be said to constitute the essential items of novelty involved, which items are intended to be defined and secured to me by the following claims.

I claim:

1. An electric switch comprising a movable contact member, terminal contact members engaged by said movable contact member when in on-position, manually operable means for normally positioning said movable contact member in on-position or off-position, a heat responsive element and a current responsive element in series with each other and electrically connected with one of said terminal contact members, a latch controlled by said elements, and lever mechanism normally held under spring tension by said latch when in on-position, said lever mechanism engaging and forcing said manually operable means only when released by said latch for positioning said movable contact member in off-position.

2. In combination, a pair of terminal contact members, and a movable blade for bridging the same, a pair of coils in circuit with said terminal contact members, means for actuating said movable blade to open and close the circuit, and means associated with said coils and operably connected with said actuating means, said means automatically operating said actuating means upon a predetermined flow of current or rise of temperature in said coils, said actuating means being independent of said mechanism in the normal movement of said movable blade to open and close said circuit.

3. In combination, a pair of terminal contact members, and a movable blade for bridging the same, a coil in circuit with said terminal contact members, means for actuating said movable blade to open and close the circuit, and means associated with said coil but normally disconnected from said actuating means, said means connecting with and automatically operating said actuating means upon a predetermined flow of current in said coil.

4. In combination, a pair of terminal contact members, and a movable blade for bridging the same, a coil in circuit with said terminal contact members, means for actuating said movable blade to open and close the circuit, and means associated with said coil for automatically operating said actuating means upon a predetermined rise of temperature in said coil, said actuating means being independent of said mechanism in the normal movement of said movable blade to open and close said circuit.

5. In combination with a pair of terminal contact members, and a movable blade for bridging the same, of a pair of coils electrically connected in series with said terminal contact members, manually operable means for normally actuating said movable blade, and lever mechanism normally disconnected from but engaging said manually operable means to actuate said movable blade upon a predetermined flow of current.

6. An electric snap switch comprising a pair of parallel push buttons moving in opposite direction, a contact member normally moving into on-and-off positions by the actuation of said push buttons, and a heat responsive and current responsive actuated device, said device adapted to engage one of said buttons when actuated for moving said contact member to off-position.

7. An electric snap switch comprising a pair of parallel push buttons moving in opposite direction, a contact member normally moving into on-and-off positions by actuating said push buttons, a heat responsive and current responsive device adapted when actuated to engage one of said buttons for moving said contact member to off-position, said device continuing to engage said one push button for holding said contact member in off-position upon testing the line by actuating said push buttons when abnormal condition still obtains.

8. An electric snap switch comprising a pair of parallel push buttons moving in opposite direction, a contact member normally moving into on-and-off positions by actuating said push buttons, a heat responsive time element including a pivotally mounted toothed wheel normally held rigid, a latch for engaging said wheel when rigid, a spring connecting means including said spring between said latch and one of said push buttons, said connecting means being held under spring tension by said latch when engaging said wheel, said wheel being released upon an abnormal rise of temperature in said heat responsive time element whereby said push buttons will actuate to move said contact member to off-position, said heat responsive time element preventing the resetting of said latch until said wheel has again become rigid.

9. In a push button switch, a pair of push buttons for opening and closing said switch, a thermostatic element and a magnetic trip in series with each other and with at least one of the terminals of said switch, and a normally disconnected mechanical connection between said thermostatic element and magnetic trip and said pair of push buttons.

10. In a push button switch, a manually operable push button mechanism for opening and closing said switch, a thermostat including a heat coil and a self-soldering element, a magnetic trip in series with said thermostat, the armature of said magnetic trip being mechanically connected to a latch normally engaging said self-soldering element when said thermostatic and magnetic trip is set to open said switch, and a connection between said latch and said push button mechanism.

11. In a push button switch, a manually operable push button mechanism for normally opening and closing said switch, a normally disconnected thermostatic and a magnetic trip for automatically opening said switch, said thermostatic and magnetic trip being mechanically associated to operate a latch mechanism functioning to actuate said push button mechanism when abnormal current conditions obtain in said switch.

12. In a push button switch, a manually operable push button mechanism for normally opening and closing said switch, a latch mechanism, and a normally disconnected thermostatic and a magnetic trip for automatically opening said switch through said latch mechanism when abnormal current conditions obtain in said switch.

13. In a push button switch, a manually operable push button mechanism for normally opening and closing said switch, a latch mechanism, a normally disconnected thermostatic and a magnetic trip for automatically opening said switch through said latch mechanism when abnormal current conditions obtain in said switch, and means on said thermostatic and said magnetic trip for preventing the resetting of said latch mechanism until normal current condition is again restored.

In witness whereof, I have hereunto subscribed my name.

JOHN S. BAKER.